United States Patent [19]

Tye

[11] 4,285,444

[45] Aug. 25, 1981

[54] HIGH SPEED PRECISION PLANTER

[76] Inventor: John M. Tye, P.O. Box 218, Lockney, Tex. 79241

[21] Appl. No.: 113,756

[22] Filed: Jan. 21, 1980

[51] Int. Cl.³ .............................................. A01C 7/04
[52] U.S. Cl. .................................................. 221/211
[58] Field of Search .......................... 221/1, 211, 278; 111/77, 78

[56] References Cited

U.S. PATENT DOCUMENTS 3,888,387  6/1975  Deckler .............................. 111/77 X Primary Examiner—Stanley H. Tollberg
Attorney, Agent, or Firm—Wendell Coffee

[57] ABSTRACT

In a vacuum planter a second disc with standard perforations is placed within the housing so that twice as many seed may be dropped with the same rotational speed and perforation spacing.

16 Claims, 5 Drawing Figures

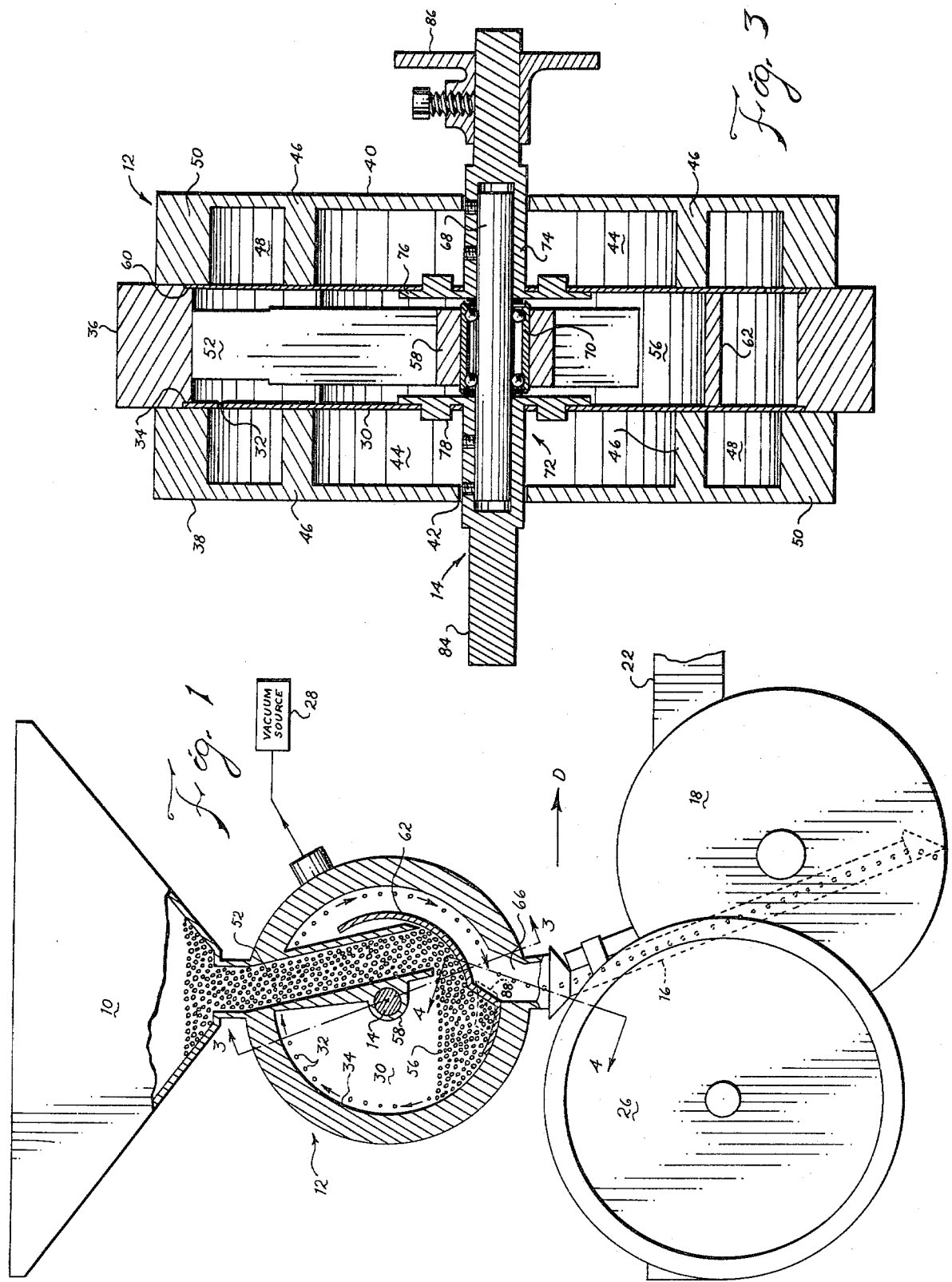

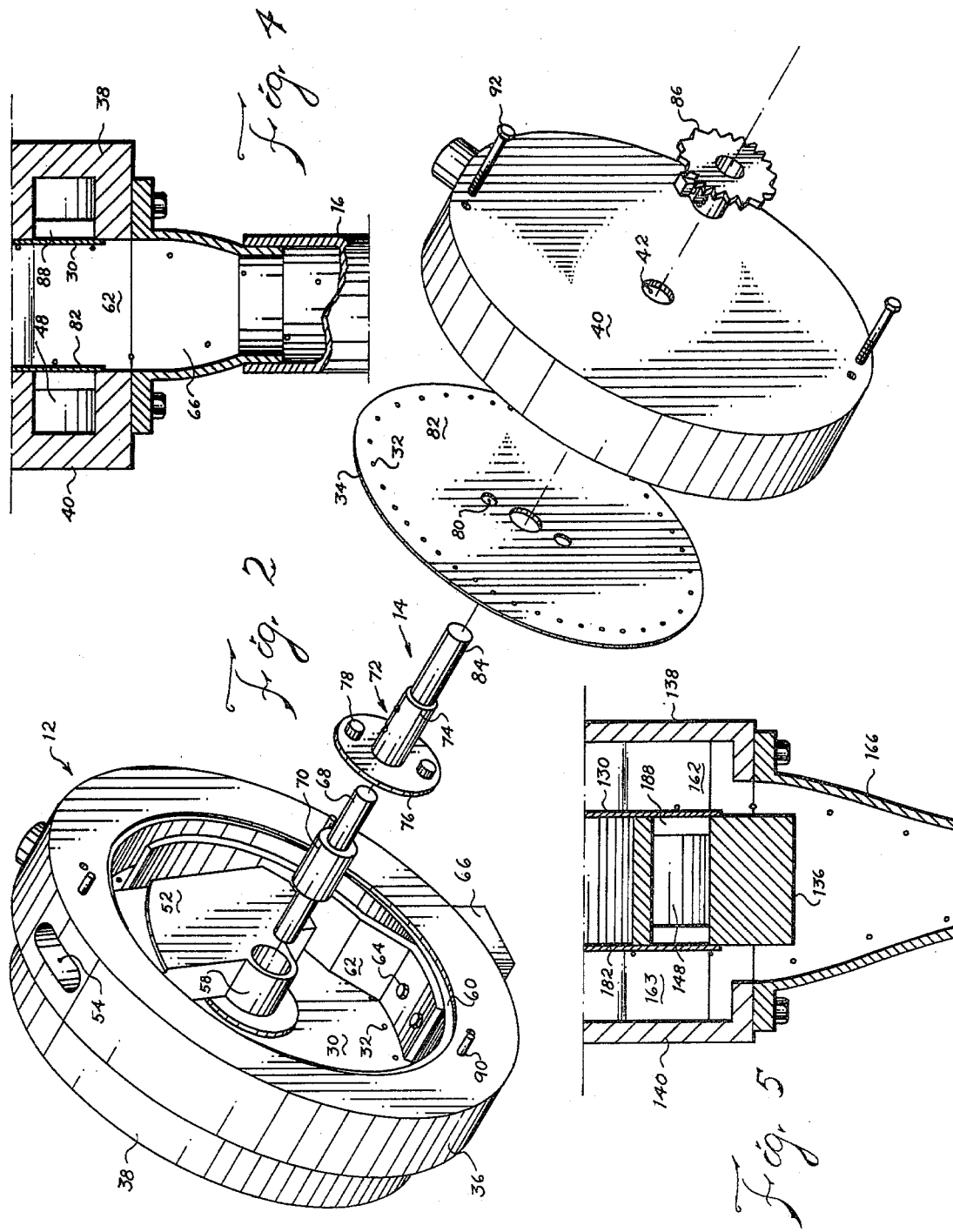

HIGH SPEED PRECISION PLANTER

BACKGROUND OF THE INVENTION (1) Field of the Invention

This invention relates to agricultural planters to drop seed and more particularly to a vacuum single seed precision planter.

(2) Description of the Prior Art

There have recently been developed single seed planters using a vacuum to hold single seed to a perforated disc. GUGENHAM, U.S. Pat. No. 3,990,606 issued Nov. 9, 1976, shows such a system.

These systems include a perforated plate or disc which separates a seed reservoir from a vacuum chamber. Differential pressure hold the seed from the seed reservoir to the disc. As the disc is rotated it brings the seed to a release mechanism. The release mechanism may be either an interupter or an ejector. Normally, an interupter will interupt the vacuum upon the perforation and, therefore, permit the seed to drop because there is no vacuum. An ejector is similar to a scraper which ejects the seed by scraping it off the plate.

Vacuum planters have a definite limitation as to the number of seeds which can be dropped for a unit time. This limit is imposed by the number of holes or perforations which can be placed in the plate and the linear speed at which the plate can be moved through the reservoir of seed. Since there is this limitation on the number of seeds that can be dropped, this limits a top speed of the planter to plant the seed at the desired plant density.

It has been suggested that a solution to this problem is that the seed be held by differential air pressure upon the peripheral face of a drum rather than upon a radial face of the disc. Then, more than one row of the seed may be held to the drum. ENEBECK, U.S. Pat. No. 2,505,758, discloses such an arrangement. Other workers in the field, such as PARKS, JR. U.S. Pat. No. 4,148,414, and BAUMAN ET AL. U.S. Pat. No. 3,762,603, have used such a drum with a series of perforations therein with each perforation being used with a separate discharge chute.

Before this application was filed applicant was also aware of the following U.S. Pat. Nos.:

LAMAZOU ET AL.—2,991,909;
WINTER—3,142,274;
STERLING—3,209,888;
LOESCH ET AL.—3,637,108;
ZAGOTTA ET AL.—3,680,737;
BEEBE—3,788,518.

SUMMARY OF THE INVENTION (1) New and Different Function

I have solved the problem of being able to precisely and rapidly drop seeds by using a second disc. The preferred method is to have a single seed reservoir with a perforated disc on each side and a vacuum chamber on the outside of each disc. Then, with the holes staggered as between the two discs the seed are dropped into a single seed chute. The rate of dropping the seeds is doubled with little or no sacrifice in dropping the single seeds at precise spacings. The seeds are thus planted at precise distances along the drill.

A variation of the preferred form is to have two seed reservoirs, one outboard of each disc, with a single vacuum chamber between the two discs.

Thus it may be seen that the total function of the combination of elements far exceed the sum of the functions of the individual elements such as discs, chutes, chambers, etc.

(2) Objects of this Invention

An object of this invention is to precisely plant seed in an agricultural field.

Further objects are to rapidly achieve the above with a device that is sturdy, compact, durable, lightweight, simple, safe, efficient, versatile, ecologically compatible, energy conserving, and reliable, yet inexpensive and easy to manufacture, install, adjust, operate and maintain.

Other objects are to achieve the above with a method that is versatile, ecologically compatible, energy conserving, rapid, efficient, and inexpensive, and does not require highly skilled people to install, adjust, operate, and maintain.

The specific nature of the invention, as well as other objects, uses, and advantages thereof, will clearly appear from the following description and from the accompanying drawing, the different views of which are not scale drawings.

BRIEF DESCRIPTION OF THE DRAWINGS

FIG. 1 is a side view partially in section of an embodiment of my invention complete with those parts of the planter closely associated with its operation.

FIG. 2 is an exploded view of the invention shown in FIG. 1.

FIG. 3 is an axial sectional view taken substantially along line 3—3 of FIG. 1.

FIG. 4 is a sectional view taken substantially along line 4—4 of FIG. 1.

FIG. 5 is a sectional view substantially similar to FIG. 4 but showing a second embodiment.

DESCRIPTION OF THE PREFERRED EMBODIMENT

Referring to the drawing, FIG. 1 somewhat schematically represents an embodiment of this invention. For clarity the support of seed box 10 is not shown. Housing 12 is attached to the bottom of the seed box. Shaft 14 is journalled for rotation through the housing 12. Discharge chute 16 connects to the housing 12 and extends to earth working implement or planter disc 18. The planter is pulled by draw bar 22, a means for drafting the planting disc 18 in a direction of draft "D". Press wheel 26 is mounted upon the draw bar 22 for properly pressing the soil around the dropped seed. An outlet nozzle and a hose (not shown) form a means for connecting the housing to vacuum source 28.

First disc 30 is mounted upon the shaft 14 to rotate therewith. The shaft 14 is horizontal and normal to the direction of draft "D". The disc 30 is a thin plate and has a plurality of perforations or holes 32 near its periphery 34.

The equipment as described to this point is basically old and well known to the art.

The housing 12 has three parts: center part 36, first vacuum cover 38 and second vacuum cover 40, FIGS. 2 and 3. Each of the vacuum covers have a central shaft opening 42 therethrough. Also, the vacuum covers 38 and 40 have a flat internal innerface. The vacuum covers have two concentric cavities on the internal face. The central cavity 44 is concentric with the shaft opening 42. It is bounded on its outer edge by internal wall 46. Ring shaped vacuum chamber 48 is formed on each of the vacuum covers 38 and 40 between the internal wall 46 and the external wall 50 which is concentric with the internal wall 46 and central shaft opening 42.

The center part 36 of the housing 12 is basically ring shaped. Seed spout 52 and bearing support 58 extend downward from the top. Opening 54 in the top of part 36 connects the seed box 10 to the spout 52 to provide seed to seed reservoir 56. The bearing support 58 is attached on the rear portion of the seed spout 52. The seed spout terminates at approximately one-third the distance from the top to bottom of the ring. The edges of the ring of part 36 are flat except for ledge 60 which is formed adjacent the inside diameter thereof.

Seed shield 62 is attached by bolts 64 near the bottom of the center part 36 and covers out spout 66 by which the discharge chute 16 is attached. The seed shield 62 extends about two-thirds the way up from the bottom to the top of the ring of the center part 36.

Shaft 14 is a composite member. The composite member includes the bearing shaft 68 which has bearing 70 within the bearing support 58 of the center part 36. Disc holders 72 are attached to the bearing shaft 68. Each disc holder 72 includes a sleeve portion 74 which telescopes over the bearing shaft 68 and is attached thereto by set screws. Plate 76 is that portion of the disc holder 72 adjacent to the inboard portion of the vacuum chamber 44. Lugs 78 on the plate 76 extend into the central cavity 44 and mate with lug holes 80 in the first disc 30 and the second disc 82. The second disc 82, like the first disc 30, has holes 32 evenly spaced and adjacent its periphery 34. However, the holes as between the first disc 30 and second disc 82 are staggered from one another when the discs are assembled upon the disc holders 72. Each of the disc holders 72 also has sprocket nub 84. Sprocket 86 is attached to one of the sprocket nubs 84 by suitable set screw. The sprocket 86 forms means for rotating the shaft 14 and thus the discs 30 and 82. The discs 30 and 82 are made of thin plate.

The seed shield 62, besides shielding the seed from the out spout 66, also function to eject the seed from the holes 32. The seed are released from the discs 30 and 82 by interupter 88 attached within the vacuum chamber 48 at the point of release. Therefore, the interupters 88 form release means on the housing for releasing seed from the discs and into the chute 16. The seed shield 62, with each of edges, acts as a means for releasing seed. I.e., one edge acts as a release means on the housing for the discs 30 and the other edge acts for a release means on the housing for the disc 82.

The exact placement of the interupters 88 and particularly the placement of the interupters 88 in connection with the edge of the seed shield 62 that functions as a ejector are not part of the invention covered by this application. Basically, the function and inter-action of the interupters and ejectors are known and discussed as for example in the GUGENHAN U.S. Pat. No. 3,990,606.

The embodiment as discussed to this point and which has been shown in FIGS. 1 through 4 discloses the seed reservoir 56 on the seed side of both of the disc 30 and 82 and it also shows two vacuum chambers 48, one on the vacuum side of first disc 30 and one in a separate vacuum chamber on the vacuum side of second disc 82. It will be understood that the vacuum upon the disc 30 and 82 will hold them securely against the flat internal innerfaces of the vacuum covers 38 and 40. The discs are within the ledge 60 formed around the inside portion of the center part 36. Also, it may be seen that the discs do not have to fit flatly against the plates 76 which are a part of the shaft 14 but if the vacuum pulls them outboard slightly they are free to move outwardly and the plates 76 do not hinder their movement. I.e., it is the vacuum within the vacuum chamber 48 which holds the plates against the flat internal innerface of the vacuum covers 38 and 40. The position of the holes 32 and the staggering of the holes between the discs 30 and 82 is precisely adjusted by where the disc holders 72 are connected, relative to one another, to the bearing shaft 68. Once this connection is made, the set screws holding the disc holders 72 to the bearing shaft are securely tightened.

Dowels or pins 90 on the central part 36 mate with holes in the covers 38 and 40 to precisely position the parts together. Studs or bolts 92 extend through the cover into tapped holes within the central part 36.

Those having ordinary skill in the art will understand that the basic arrangement of the seed reservoir 56 and the vacuum chamber could be reversed. FIG. 5 illustrates such a apparatus with the parts reversed. It will be understood that basically the apparatus according to FIG. 5 would be basically the same as that shown in FIGS. 1–4 except that the vacuum nozzle to connect the housing to the vacuum source 28 would be in the center part of the housing 136. The two outer or cover portions of the housing, reservoir cover 138 and reservoir cover 140, would have convenient spouts entering them by which a seed reservoir would be maintained.

Vacuum chamber 148 will be formed within the center part 136. The two interupters 188 would be attached to the center part 136 as illustrated in FIG. 5. One seed shield 162 is within one of the seed covers 148 and a second seed shield 163 is within the second seed cover 140. The edge of the seed cover 162 and an edge of the seed cover 163 would act to eject the seed from the discs 130 and 182 as before.

It will be understood that the purpose of this description and the illustrations is to describe my invention which is to plant seeds at a fast rate by having two discs. Certain elements have not been disclosed. E.g., no mechanism is disclosed to insure that only one seed is held to each hole. Elements for this purpose are well known in the vacuum single seed planters and, therefore, have not been shown here for the purposes of clarity in the illustrations to avoid cluttering the drawings and this description with parts which are known in this art.

As an aid to correlating the terms of the claims to the exemplary drawings, the following catalog of elements is provided:

| "D" — Direction of Draft | |
|---|---|
| 10 seed box | 54 opening |
| 12 housing | 56 seed reservoir |
| 14 shaft | 58 bearing shaft |
| 16 discharge chute | 60 ledge |
| 18 planter disc | 62 seed shield |
| 22 draw bar | 64 bolt |
| 26 press wheel | 66 out spout |
| 28 vacuum source | 68 bearing shaft |
| 30 first disc | 70 bearing |
| 32 holes | 72 disc holder |
| 34 periphery | 74 sleeve portion |
| 36 center part | 76 plates |
| 38 first vacuum cover | 78 lugs |
| 40 second vacuum cover | 80 lug holes |
| 42 central shaft opening | 82 second disc |
| 44 central cavity | 84 sprocket nub |
| 46 internal wall | 86 sprocket |

-continued

| | |
|---|---|
| "D" — Direction of Draft | |
| 48 vacuum chamber | 88 interupter |
| 50 external wall | 90 pins |
| 52 seed spout | 92 bolts |

The embodiments shown and described above are only exemplary. I do not claim to have invented all the parts, elements or steps described. Various modifications can be made in the construction, material, arrangement, and operation, and still be within the scope of my invention. The limits of the invention and the bounds of the patent protection are measured by and defined in the following claims. The restrictive description and drawing of the specific example above do not point out what an infringement of this patent would be, but are to enable the reader to make and use the invention.

SUBJECT MATTER CLAIMED FOR PROTECTION

I claim as my invention:
1. A precision planter having
   a. a seed box,
   b. a vacuum source,
   c. a first perforated disc having a seed side and a vacuum side,
   d. a housing around the disc,
   e. a rotatable shaft through the housing,
   f. said disc mounted on said shaft,
   g. a seed reservoir on the seed side of the disc connected to the seed box,
   h. a vacuum chamber on the vacuum side of the disc connected to the vacuum source,
   i. a discharge chute connected to the housing and extending to an earth working implement, and
   j. release means on the housing for releasing seed from the disc and into the chute;
wherein the improvement comprises:
   k. a second perforated disc mounted on said shaft,
   l. a seed reservoir on a seed side of said second disc,
   m. a vacuum chamber on a vacuum side of said second disc, and
   n. a second release means for releasing said seed from said second disc and into said chute.
2. The invention as defined in limitations a. through n. of claim 1 wherein
   o. said vacuum chamber on the vacuum side of said second disc is the same vacuum chamber as is on the vacuum side of the first disc, and
   p. said seed reservoir on the seed side of said second disc is a separate seed reservoir than that on the seed side of the first disc.
3. The invention as defined in limitations a. through n. of claim 1 wherein
   o. said seed reservoir on the seed side of said second disc is the same seed reservoir as is on the seed side of the first disc, and
   p. the vacuum chamber on the vacuum side of the second disc is separate from the vacuum chamber on the vacuum side of the first disc.
4. The invention as defined in limitations a. through n. of claim 1 wherein each of the discs are mounted on the shaft with
   o. a pair of lugs on
   p. a plate portion of
   q. a disc holder part of the shaft;
   r. the lugs fitting into disc holes on the disc and said plate against the seed side of the disc.
5. The invention as defined in limitations a. through n. of claim 1 wherein
   o. said first and second release means are aligned with each other, and
   p. the perforations in said first and second disc are staggered from each other.
6. The invention as defined in limitations a. through p. of claim 5 wherein each of the discs are mounted on the shaft with
   q. a pair of lugs on
   r. a plate portion of
   s. a disc holder part of the shaft;
   t. the lugs fitting into disc holes on the disc and said plate against the seed side of the disc.
7. The invention as defined in limitations a. through t. of claim 6 wherein
   u. said vacuum chamber on the vacuum side of said second disc is the same vacuum chamber as is on the vacuum side of the first disc, and
   v. said seed reservoir on the seed side of said second disc is a separate seed reservoir than that on the seed side of the first disc.
8. The invention as defined in limitations a. through t. of claim 6 wherein
   u. said seed reservoir on the seed side of said second disc is the same seed reservoir as is on the seed side of the first disc, and
   v. the vacuum chamber on the vacuum side of the second disc is separate from the vacuum chamber on the vacuum side of the first disc.
9. The invention as defined in limitations a. through t. of claim 6 wherein
   u. the discs are held against a flat face of the vacuum chamber by differential pressure.
10. A precision planter having
    a. a seed box,
    b. a vacuum source,
    c. at least one perforated disc having a seed side and a vacuum side,
    d. a housing around the disc,
    e. a rotatable shaft through the housing,
    f. said disc mounted on said shaft,
    g. a seed reservoir on the seed side of the disc connected to the seed box,
    h. a vacuum chamber on the vacuum side of the disc connected to the vacuum source,
    i. a discharge chute connected to the housing and extending to an earth working implement, and
    j. release means on the housing for releasing seed from the disc and into the chute;
wherein the improvement comprises:
    k. a plate on the shaft,
    l. a pair of lugs on the plate,
    m. the lugs fitting into disc holes on the disc,
    n. said plate fitting against the seed side of the disc,
    o. said disc is held against a flat face of the vacuum chamber by differential pressure, and
    p. a second disc mounted upon said shaft as defined above.
11. A process for precisely planting seed including
    a. rotating a first perforated disc in a housing,
    b. supplying a reservoir of seed against a seed side of the disc,
    c. applying differential air pressure to the disc with a higher air pressure upon the seed side of the disc from the other side of the disc in order to d. hold seed to the perforations in the disc, and
e. releasing the seed from the disc into a discharge chute;

wherein the improvement comprises:
  f. rotating a second perforated disc in the housing,
  g. supplying a reservoir of seed against a seed side of the second disc,
  h. applying differential air pressure to the second disc with a higher air pressure upon the seed side of the second disc than upon the other side of the disc, in order to
  i. hold seed to the perforations in the second disc, and
  j. releasing the seed from the second disc into the discharge chute.

12. The invention as defined in limitations a. through j. of claim 11 wherein
  k. said releasing is accomplished, at least in part, by equalizing the air pressure on the two sides of each of the disc.

13. The invention as defined in limitations a. through j. of claim 11 further comprising:
  k. holding the seed onto the two discs by said differential pressure so that the seed are staggered from one disc to the other, and
  l. releasing the seed at the same point at the bottom of the disc in order that the seed fall into the chute from first one disc and then the other at equal time intervals.

14. The invention as defined in limitations a. through j. of claim 11 wherein
  k. said differential pressure is ambient pressure on the seed side and below ambient pressure on the other side.

15. The invention as defined in limitations a. through k. of claim 14 further comprising:
  l. holding the seed onto the two discs by said differential pressure so that the seed are staggered from one disc to the other, and
  m. releasing the seed at the same point at the bottom of the disc in order that the seed fall into the chute from first one disc and then the other at equal time intervals.

16. The invention as defined in limitations a. through m. of claim 15 wherein
  n. said releasing is accomplished, at least in part, by equalizing the air pressure on the two sides of each of the disc.

* * * * *